United States Patent

[11] 3,597,991

| [72] | Inventors | James A. McCormick, Jr. <br> Northville; <br> Julius Hezler, Jr., Bellaire, both of, Mich. |
|---|---|---|
| [21] | Appl. No. | 12,253 |
| [22] | Filed | Feb. 18, 1970 |
| [45] | Patented | Aug. 10, 1971 |
| [73] | Assignee | General Motors Corporation <br> Detroit, Mich. |

[54] TRANSMISSION SELECTOR
3 Claims, 6 Drawing Figs.

[52] U.S. Cl........................................................ 74/476, 74/480
[51] Int. Cl........................................................ G05g 13/00
[50] Field of Search........................................................ 74/480, 479, 477, 475, 476, 473

[56] References Cited
UNITED STATES PATENTS
3,301,086 1/1967 Williams et al.............. 74/475

*Primary Examiner*—Milton Kaufman
*Attorneys*—W. E. Finken, A. M. Heiter and D. F. Scherer ABSTRACT: Disclosed herein is a control mechanism including a first manual lever adapted to select one mode of operation and a second manual lever adapted to select another mode of operation and a linkage connecting the two selector levers to prevent simultaneous movement of the two levers. The interconnecting linkage also provides automatic cancellation of the mode selected by the second lever when the first lever is actuated.

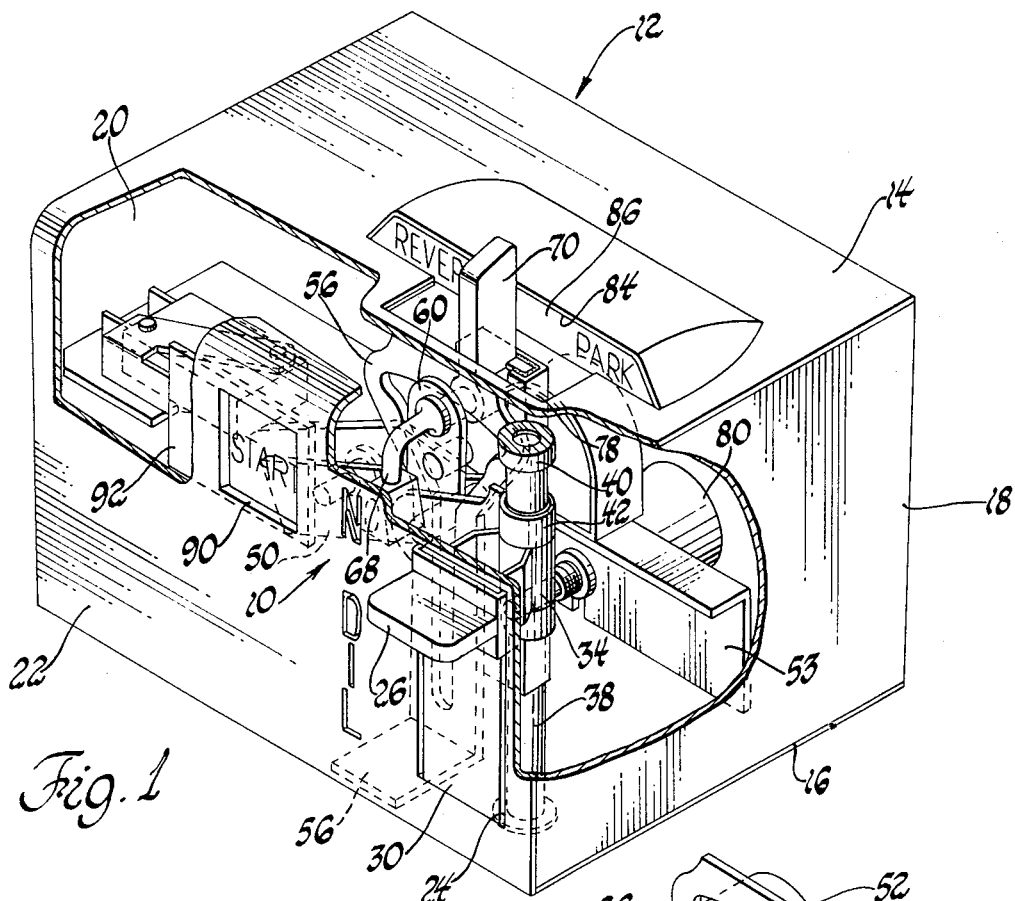
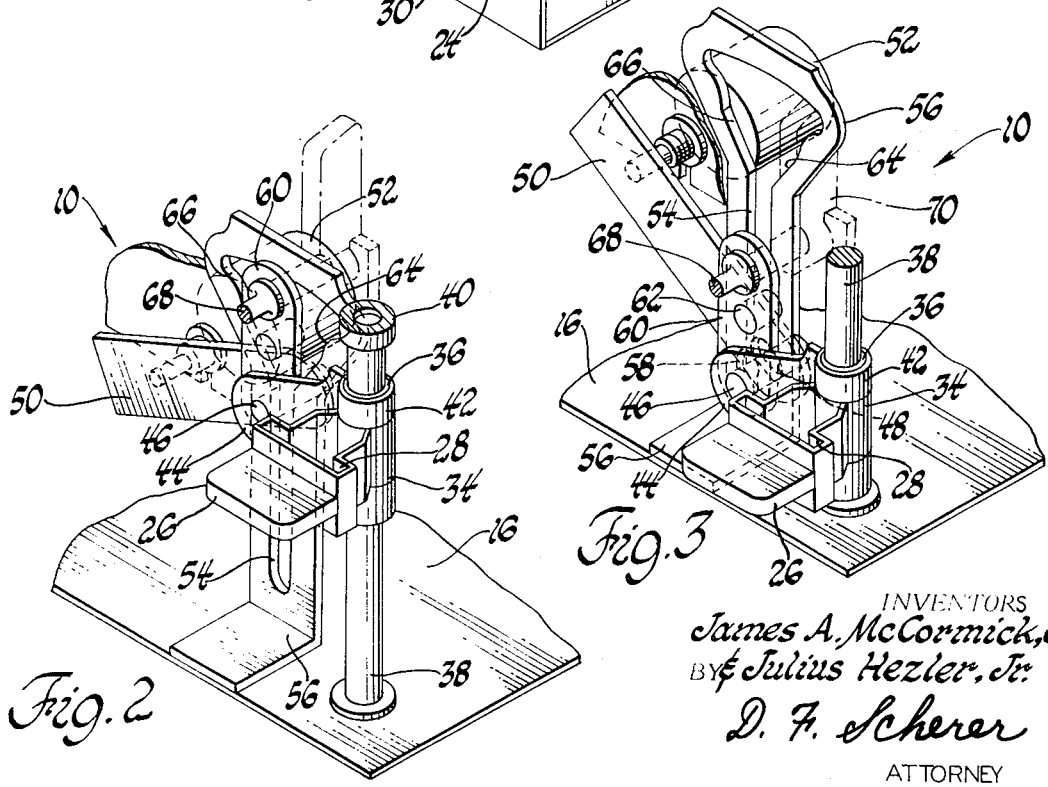

INVENTORS
James A. McCormick, Jr.
BY Julius Hezler, Jr.

D. F. Scherer
ATTORNEY

TRANSMISSION SELECTOR

This invention relates to selector mechanism and more particularly to selector mechanism providing an automatic cancellation of one mode of operation when a second mode of operation is selected.

The present invention includes a forward selector lever operatively connected to an actuator such as an electrical switch and is particularly useful for selecting forward drive ratios in an automatic transmission. A second selector lever operatively connected to a second actuator such as electrical switch is provided and may be used to permit the operator to select a reverse drive or a park mode of operation. The two selector levers are interconnected by a linkage which includes cam surfaces. The cam surfaces are so constructed such that when a forward drive ratio is selected a previously selected park or reverse position of the second lever is automatically cancelled. Also when a forward drive is selected the second selector lever is rendered inoperative. The selector mechanism which is the subject of the present invention may be adapted to be used with any of the prior art transmission using solenoid control shift valves.

It is an object of this invention to provide a selector mechanism having a pair of selector levers interconnected by cam and linkage cancelling mechanism such that the mode selected by one lever is automatically cancelled upon selection of a mode by the other lever.

Another object of this invention is to provide in an improved selector mechanism a pair of selector levers such that operation of one selector lever prevents operation of the other selector lever.

These and other objects and advantages of the present invention will be more apparent from the following description and drawings in which:

FIG. 1 is an isometric view of the selector mechanism;

FIG. 2 is an isometric view of a portion of the selector mechanism shown in one position;

FIG. 3 is an isometric view of a portion of the selector mechanism shown in another position;

Figure 4:
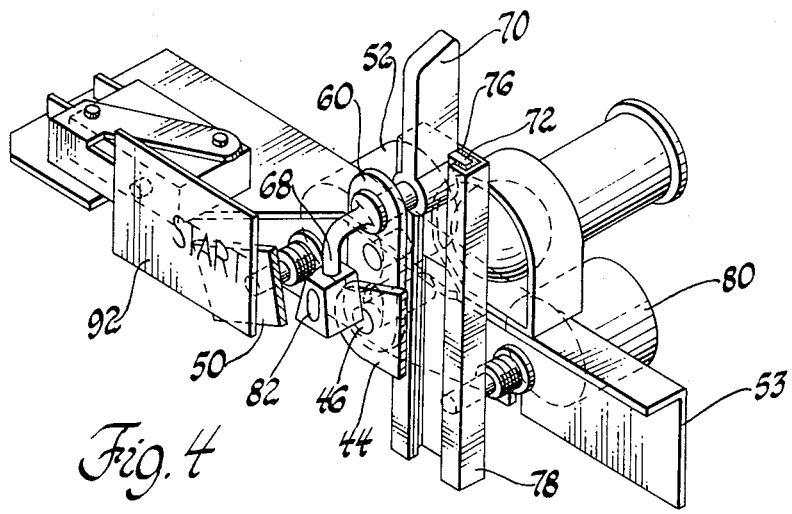
FIG. 4 is an isometric view of another portion of the selector mechanism shown in one position.
Figure 5:
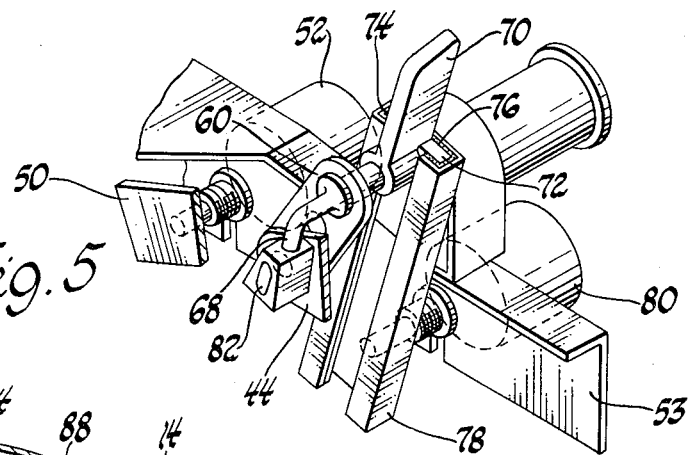
FIG. 5 is an isometric view of the other portion of the selector mechanism in another position.
Figure 6:
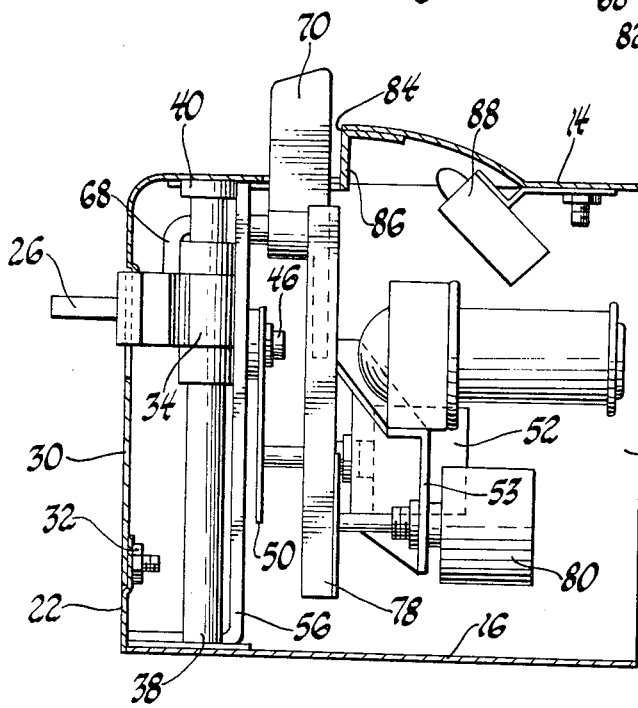
FIG. 6 is an elevational view partly in section of the selector mechanism.

Referring to the drawings there is seen a selector mechanism generally designated 10 located in a housing 12 having a top panel 14, a bottom panel 16, a right side panel 18, a left side panel 20 and a front panel 22. The front panel 22 has an opening 24 through which extends a forward selector handle 26 which has a rectangular opening 28. A cover plate 30 extends through the rectangular opening 28 and is secured to the front panel 22 by a fastener 32. The forward handle 26 has a circular bearing receiving portion 34 which surrounds a slide bearing 36. The bearing 36 is slidably disposed on a shaft or standard 38 which is secured between the bottom panel 16 and the top panel 14 by a fastener 40 which is secured to the top panel 14. Also mounted on the bearing 36 is a link member 42 which moves up and down the standard 38 in unison with the forward handle 26. The link 42 has an arm 44 extending from adjacent the post 38 and has a pin 46 secured thereto. The pin 46 is also disposed in an elongated slot 48 in a lever member 50 which is drivingly connected to an actuator such as an electrical switch 52 which is secured to the housing 12 by a bracket 53.

The pin 46 is also slidably disposed in a slot 54 located in a cancelling guide 56 which is secured to the bottom panel 16. The pin 46 also passes through an elongated slot 58 in a cancelling link 60 which link 60 has a pin 62 secured thereto and slidably disposed in the slot 54. The upper end of the slot 54 forms a triangular shaped opening having cam surfaces 64 and 66.

A light carrier 68 is also secured to the cancelling link 60 and passes through the slot 54 where it is secured to a park and reverse lever 70. The park and reverse lever 70 has guide members 72 and 74 secured thereto which are surrounded by a plastic bearing 76 slidably disposed in a handle slide 78 which is secured near its lower end to an actuator such as an electrical switch 80 which is also secured to the bracket 53.

The light carrier 68 contains a light bulb not shown and has an opening 82 which permits light to pass through the light carrier 68 to illuminate the indicia N, D, I and L stamped in the front panel 22 of the housing 12. As the forward handle 26 is moved upward or downward on the standard 38, the light carrier 68 will be aligned with the various indicia so that the operator can readily read the position of the forward handle 26. The top panel 14 has an opening 84 in which is secured a plate 86 with the words "reverse" and "park" printed thereon. A light source 88 illuminates the plate 86 to permit the operator to readily determine whether the reverse lever 70 is in the park or reverse position. The front panel 22 has a second opening 90 over which is located a plate 92 imprinted with the word "start." A light source not shown is located behind the plate 92 such that the plate 92 will be illuminated when the ignition is on but the engine is not running, thereby indicating the vehicle is ready to start.

During operation when a forward drive mode is desired, the handle 26 is moved downwardly from the neutral N position to one of the forward drive positions D, I or L. This linear movement of the handle 26 is transferred through the link 42 and the lever 50 to the electrical switch 52. Since the electrical switch 52 is secured to the housing 12 the linear movement of the pin 46 is converted to rotational movement in the lever 50 so that the input to the electrical switch 52 is rotated to the desired position. As the handle 26 is moved downwardly the handle 70, due to the connection of the cancelling link 60 between the two handles, moves downwardly also so that when the handle 26 is at the D-position both pins 46 and 62 will be positioned in the slot 54 to prevent pivotal movement of the handle 70. Thus a reverse or park mode cannot be selected when a forward drive mode has been selected.

With the handle 26 in the neutral position the reverse lever 70 can be pivoted to the reverse or park position thus actuating the electrical switch 80. When the handle 70 is moved to the reverse position the pin 62 will contact the cam surface 66 and when the handle 70 is moved to the park position the pin 62 will contact the cam surface 64. With the selector mechanism conditioned for either the park or reverse mode, a forward drive mode can be selected. However, as the operator moves the handle 26 toward a forward drive mode, the pin 62 will follow with cam contour 64 or 66 to place the reverse handle 70 in the intermediate or neutral position shown in FIG. 1 so that the reverse or park mode will be automatically cancelled.

The above description and drawings are illustrative of the preferred embodiment of the invention and are not intended as limitations. Modifications and variations will be readily apparent to those skilled in the art and it is therefore intended that the invention be defined by the scope of the following claims:

What I claim is:

1. A control mechanism comprising
   first selector means for selecting one mode of operation including
      guide standard means, first handle means slidably mounted on said guide standard means and being linearly moveable to first and second positions, first actuator means for providing one output from the control mechanism, and linkage means operatively connected between said handle means and said first actuator means for converting linear motion of said first handle means to rotary motion of said first actuator means;
   second selector means for selecting another mode of operation including second actuator means for providing another output, and second handle means mounted on said second actuator means and being pivotable to first, second and third positions; and cancelling means including
cancelling link means for operatively connecting said second selector means and said linkage means, and cancelling cam means coacting with said cancelling link means and said linkage means for locating said second selector means in the second position when said first selector means is moved linearly from said first to said second position.

2. A transmission shift control mechanism comprising forward-drive-selecting means including
guide standard means, forward selector means slidably mounted on said guide standard means and being linearly moveable to first and second positions, forward electric switch means, and forward linkage means operatively connected between said forward selector means and said forward electric switch means for converting linear motion of said forward selector means to rotary motion of said forward electric switch means;

reverse-drive-selecting means including
reverse electric switch means, and reverse selector means mounted on said reverse electric switch means and being pivotable to first, second and third positions; and cancelling means including
cancelling link means for operatively connecting said reverse selector means and said forward linkage means, and cancelling cam means coacting with said cancelling link means and said forward linkage means for locating said reverse selector means in the second position when said forward selector means is moved linearly from said first to said second position.

3. A transmission shift control mechanism comprising forward-drive-selecting means including
guide standard means, forward selector means slidably mounted on said guide standard means and being linearly moveable to first and second positions, forward electric switch means and forward linkage means operatively connected between said forward selector means and said forward electric switch means for converting linear motion of said forward selector means to rotary motion of said forward electric switch means;

reverse-drive-selecting means including
reverse electric switch means, and reverse selector means mounted on said reverse electric switch means and being pivotable to first, second and third positions; and cancelling means including
cancelling link means for operatively connecting said reverse selector means and said forward linkage means, cancelling guide means coacting with said cancelling link means and said forward linkage means having cam means for moving said reverse selector means from said first or third position to said second position when said forward selector means is moved linearly from said first to said second position, and slot means for positioning said cancelling link means to prevent pivoting of said reverse selector means from said second position when said forward selector means is in the second position.